(12) United States Patent
Shibuya (10) Patent No.: US 11,163,507 B2
(45) Date of Patent: Nov. 2, 2021

(54) IMAGE FORMING SYSTEM INCLUDING IMAGE FORMING APPARATUS FOR OUTPUTTING RECORDING MEDIA ON WHICH IMAGES ARE FORMED, AND POST-PROCESSING APPARATUS FOR SORTING RECORDING MEDIA OUTPUTTED FROM IMAGE FORMING APPARATUS

(71) Applicant: KYOCERA Document Solutions Inc., Osaka (JP)

(72) Inventor: Teppei Shibuya, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 67 days.

(21) Appl. No.: 16/667,410

(22) Filed: Oct. 29, 2019

(65) Prior Publication Data

US 2020/0133599 A1    Apr. 30, 2020

(30) Foreign Application Priority Data

Oct. 29, 2018 (JP) .............................. JP2018-202702

(51) Int. Cl.
*G06F 3/12* (2006.01)
*B41J 29/58* (2006.01)
*B65H 31/22* (2006.01)

(52) U.S. Cl.
CPC ............ *G06F 3/1238* (2013.01); *B41J 29/58* (2013.01); *B65H 31/22* (2013.01); *B65H 2402/64* (2013.01); *B65H 2405/121* (2013.01)

(58) Field of Classification Search
CPC .... G06F 3/1238; G06F 3/1222; G06F 3/1264; B65H 2402/64; B65H 2405/121; B65H 2402/45
See application file for complete search history.

(56) References Cited

U.S. PATENT DOCUMENTS

| 5,452,058 A * | 9/1995 | Umeda .............. G03G 15/6552 399/15 |
| 6,568,538 B1 * | 5/2003 | Robey .................. G06F 21/608 209/630 |
| 2008/0010079 A1 | 1/2008 | Genda |

(Continued)

FOREIGN PATENT DOCUMENTS

JP      2008-012773 A     1/2008

*Primary Examiner* — King Y Poon
*Assistant Examiner* — Michael Burleson
(74) *Attorney, Agent, or Firm* — Hawaii Patent Services; Nathaniel K. Fedde; Kenton N. Fedde (57) ABSTRACT

Provided is an image forming system capable of reliably preventing others from removing and taking printed matter even though printing is executed beforehand. The confidential notation reading unit reads a confidential notation. The user storage tray has a structure from which outputted printed matter cannot be removed unless the opening/closing door is opened. The locking mechanism locks the opening/closing door. The sorting mechanism sorts the printed matter outputted from the image forming apparatus and outputs the printed matter to either the open tray or the user storage tray. The sorting control unit outputs printed matter to which a confidential notation is not added to the open tray, and outputs a printed matter to which a confidential notation is added to the user storage tray, respectively.

2 Claims, 9 Drawing Sheets

(56) References Cited

U.S. PATENT DOCUMENTS

| | | | |
|---|---|---|---|
| 2010/0007710 A1* | 1/2010 | Miyaso | B41J 29/393 347/110 |
| 2010/0091321 A1* | 4/2010 | LeVier | H04N 1/00567 358/1.15 |
| 2018/0278780 A1* | 9/2018 | Bhaskaran | G06F 3/1259 |

* cited by examiner

|  | STORED (YES/NO) | USER ID |
|---|---|---|
| USER STORAGE STRAY — FIRST STAGE | YES | 0000201 |
| USER STORAGE STRAY — SECOND STAGE | YES | 1203654 |
| USER STORAGE STRAY — THIRD STAGE | NO | — |
| USER STORAGE STRAY — FOURTH STAGE | NO | — |
| ADMINISTRATOR STORAGE TRAY | — | — |

FIG.7

IMAGE FORMING SYSTEM INCLUDING IMAGE FORMING APPARATUS FOR OUTPUTTING RECORDING MEDIA ON WHICH IMAGES ARE FORMED, AND POST-PROCESSING APPARATUS FOR SORTING RECORDING MEDIA OUTPUTTED FROM IMAGE FORMING APPARATUS

INCORPORATION BY REFERENCE

This application is based on and claims the benefit of priority from Japanese Patent Application No. 2018-202702 filed on Oct. 29, 2018, the contents of which are hereby incorporated by reference.

BACKGROUND

The present disclosure relates to an image forming system including an image forming apparatus that outputs recording media on which images are formed and a post-processing apparatus that sorts the recording media that is outputted from the image forming apparatus.

In typical technology, there are image forming apparatuses that have a confidential printing function for specifying a user who will receive printed matter and printing the printed matter when outputting a recording media on which an image is formed as printed matter. The confidential printing function is a function of storing printing data addressed to a user, and outputting the printing data as printed matter when a user ID and password are inputted from an operation unit and authenticated.

SUMMARY

The image forming system according to the present disclosure is an image forming system that includes an image forming apparatus that outputs a recording media on which an image is formed; and a post-processing apparatus that sorts the recording media that is outputted from the image forming apparatus. The image forming apparatus includes: a confidential notation generating unit, and a confidential notation addition control unit. The confidential notation generating unit generates a confidential notation that includes user information for identifying a user. The confidential notation addition control unit adds the confidential notation to the recording media. The post-processing apparatus includes: a confidential notation reading unit, an open tray, a user storage tray, a locking mechanism, a sorting mechanism, and a sorting control unit. The confidential notation reading unit reads the confidential notation added to the recording media. The open tray has a structure that anyone may remove recording media that has been outputted. The user storage tray has a structure from which the outputted recording media cannot be removed unless an opening/closing door is opened. The locking mechanism locks the opening/closing door. The sorting mechanism sorts the recording media outputted from the image forming apparatus and outputs the recording media to either the open tray or the user storage tray. The sorting control unit controls the sorting mechanism to output the recording media to which a confidential notation is not added to the open tray, and output the recording media to which a confidential notation is added to the user storage tray, respectively. The post-processing apparatus according to the present disclosure sorts recording media that is outputted from the image forming apparatus. The post-processing apparatus includes a confidential notation reading unit, an open tray, a user storage tray, a locking mechanism, a sorting mechanism, and a sorting control unit. The confidential notation reading unit reads the confidential notation added to the recording media. The open tray is such that anyone may remove recording media that has been outputted. The user storage tray is a structure from which the outputted recording media cannot be removed unless an opening/closing door is opened. The locking mechanism locks the opening/closing door. The sorting mechanism sorts the recording media outputted from the image forming apparatus and outputs the recording media to either the open tray or the user storage tray. The sorting control unit controls the sorting mechanism to output a recording media to which a confidential notation is not added to the open tray, and output the recording media to which a confidential notation is added to the user storage tray, respectively.

DETAILED DESCRIPTION

Hereinafter, embodiments of the technique according to the present disclosure will be described in detail with reference to the drawings. Note that, in the following embodiments, the same reference numbers are given to configurations indicating the same functions.

Figure 1:
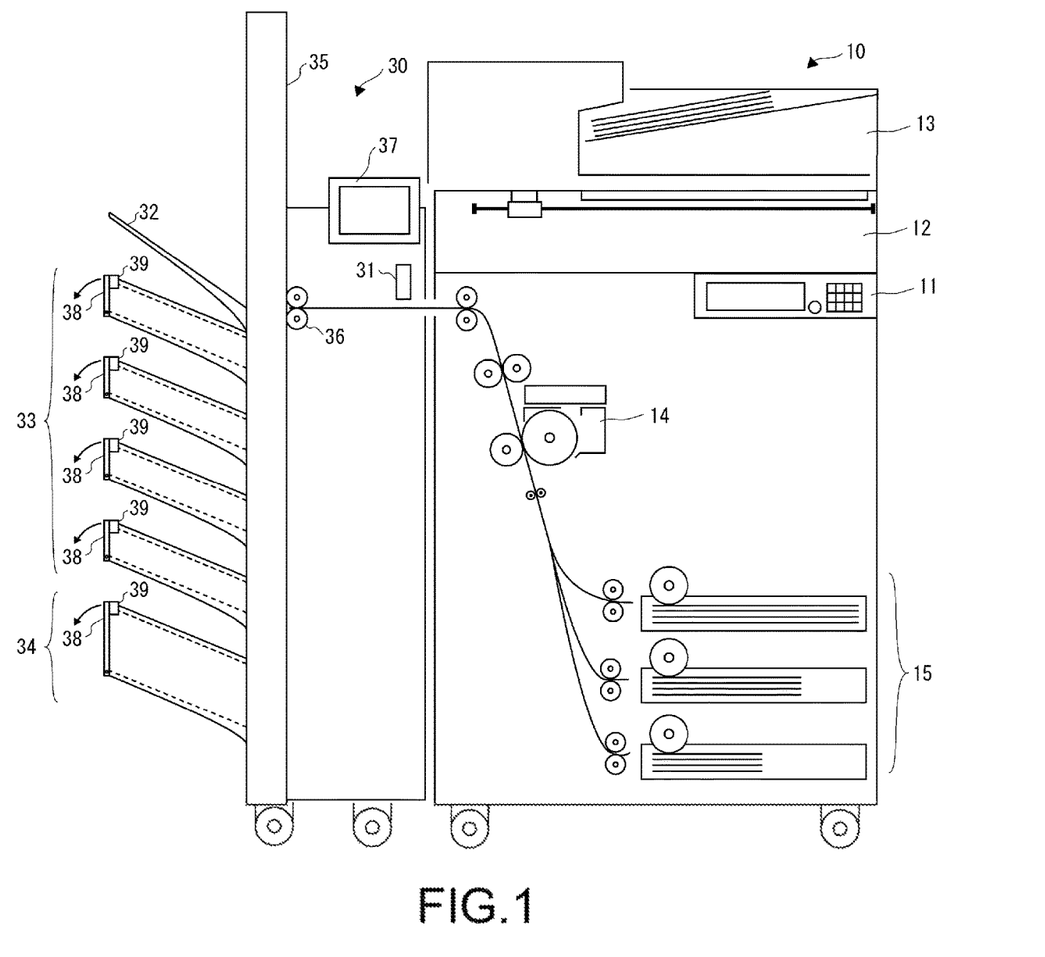
FIG. 1 is a schematic diagram illustrating a schematic configuration of an embodiment of an image forming system according to the present disclosure.

Referring to FIG. 1, the image forming system according to the present embodiment includes an image forming apparatus 10 and a post-processing apparatus 30. The image forming apparatus 10 is a MFP (Multifunction Peripheral/Printer/Product) or the like, and outputs a recording media on which an image is formed as printed matter. The post-processing apparatus 30 sorts the printed matter that is outputted from the image forming apparatus 10.

Referring to FIG. 1, the image forming apparatus 10 includes an operation unit 11, a document reading unit 12, a document feeding unit 13, an image forming unit 14, and a paper supply unit 15.

The operation unit 11 includes a touch panel, operation buttons, a liquid crystal display and the like, and has a function as an input unit for receiving input of various information and a function as a display unit for displaying various information.

The document reading unit 12 includes a scanner including an exposure lamp, a CCD (Charge Coupled Device) sensor, and the like, a platen glass, and a slit glass. The document reading unit 12 acquires image data by reading a document placed on the platen glass, and acquires image data by reading a document fed to the slit glass by the document feeding unit 13.

The document feeding unit 13 includes a document placement unit, a document output unit, and a document conveying mechanism. Documents placed on the document placement unit are fed one sheet at a time by the document conveying mechanism, conveyed to a position facing the platen glass of the document reading unit 12, and then outputted to the document output unit. Incidentally, the document feeding unit 13 is configured to be tiltable, and the upper surface of the platen glass of the document reading unit 12 can be opened by lifting the document feeding unit 13 upward.

The image forming unit 14 includes, for example, a photosensitive drum, a charging unit, an exposing unit, a developing unit, a transfer unit, a cleaning unit, and a fixing unit, and prints a formed image on a recording paper.

The paper supply unit 15 includes a plurality of paper-supply cassettes for storing respective recording paper, and paper-supply rollers for feeding the recording paper from the paper-supply cassettes one sheet at a time onto a paper conveying path to the image forming unit 14.

The recording paper fed from the paper supply unit 15 is conveyed to the image forming unit 14. Then, the recording paper on which printing has been performed by the image forming unit 14 is outputted to the post-processing apparatus 30 as printed matter.

Figure 2:
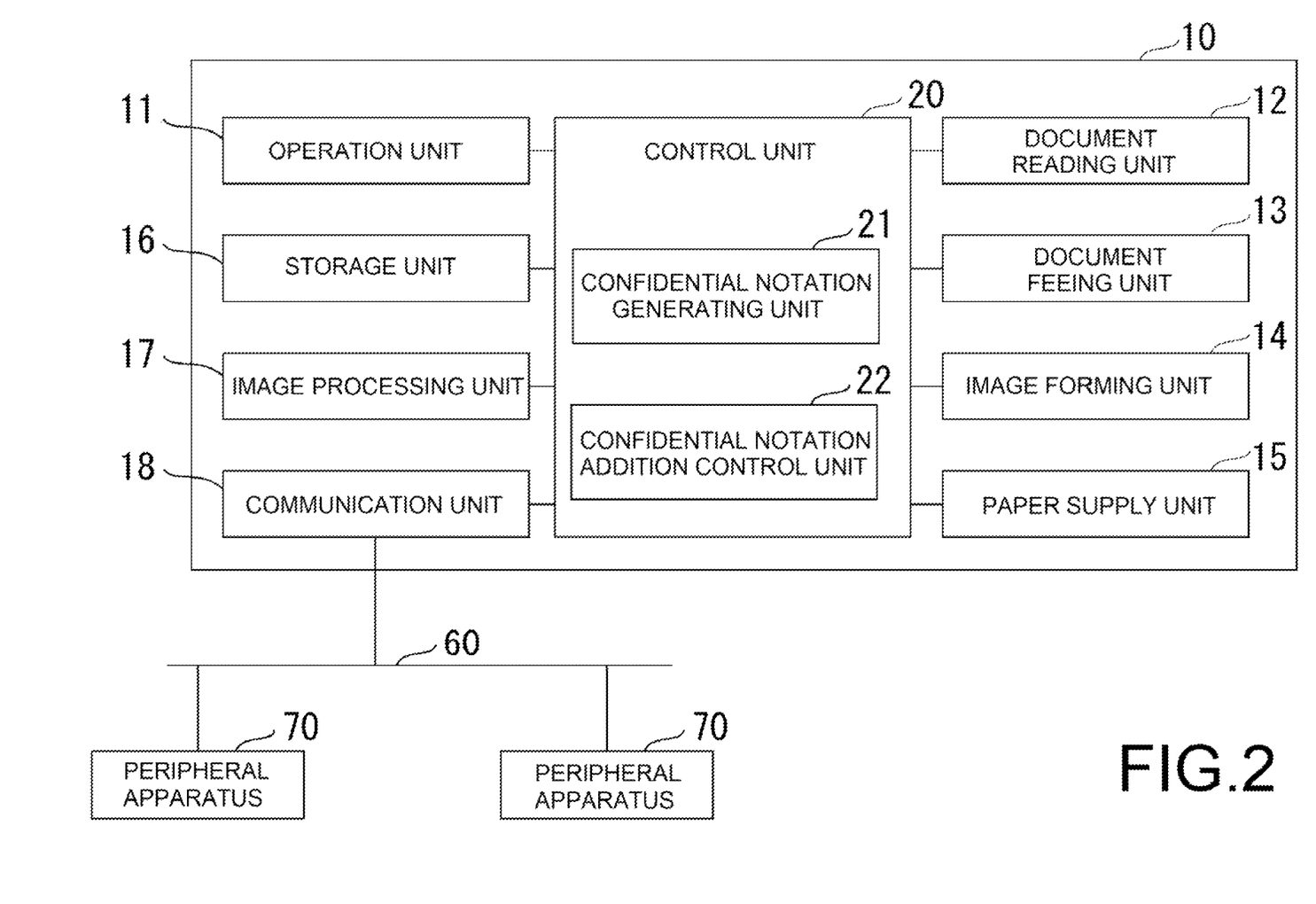
FIG. 2 is a block diagram illustrating a schematic configuration of the image forming apparatus illustrated in FIG. 1.

FIG. 2 is a block diagram illustrating a schematic configuration of the image forming apparatus 10. The operation unit 11, the document reading unit 12, the document feeding unit 13, the image forming unit 14, and the paper supply unit 15 described above are connected to a control unit 20, and the operation is controlled by the control unit 20. Furthermore, a storage unit 16, an image processing unit 17, and a communication unit 18 are connected to the control unit 20.

The storage unit 16 is a storage unit such as a semiconductor memory, a hard disk drive (HDD) or the like, and stores various image data such as image data or the like that is acquired by reading a document by the document reading unit 12.

The image processing unit 17 is an arithmetic processing circuit such as a microcomputer or the like that includes a central processing unit (CPU), a read only memory (ROM), a random access memory (RAM), and the like. The image processing unit 17, for example, executes various jobs related to image processing such as enlargement/reduction processing, density adjustment processing, gradation adjustment processing, and the like.

The communication unit 18 has a data communication function for transmitting and receiving various data to and from a peripheral apparatus 70 such as a personal computer or the like via a network 60 such as a LAN or the like.

The control unit 20 is an arithmetic processing circuit such as a microcomputer or the like that includes a central processing unit (CPU), a read only memory (ROM), a random access memory (RAM), and the like. A control program for performing operation control of the image forming apparatus 10 is stored in the ROM. The control unit 20 reads the control program stored in the ROM and develops the control program in the RAM, thereby performing overall control of the apparatus according to various instruction information that is inputted from the operation unit 11. In addition, the control unit 20 functions as a confidential notation generating unit 21 and a confidential notation addition control unit 22.

The confidential notation generating unit 21 determines whether or not a printing job received from the peripheral apparatus 70 is designated as confidential. In a case where the printing job is designated as confidential, the confidential notation generating unit 21 generates a confidential notation X that includes user information (a user ID in the present embodiment) for identifying a user who removes printed matter outputted from the image forming apparatus 10. Incidentally, in the present embodiment, the user information included in the confidential notation X is not limited to a user who creates a printing job, and other users may be specified according to the printing job.

Figure 3A:
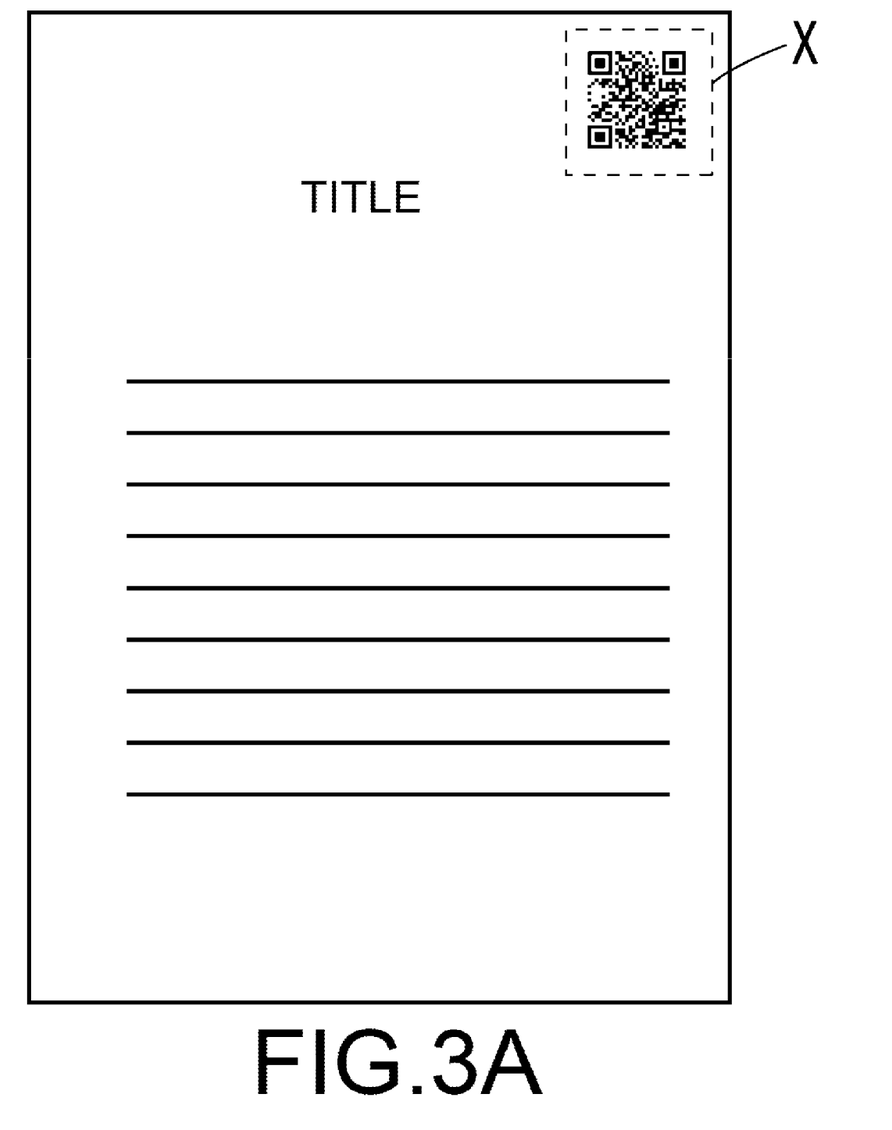
FIG. 3A is a diagram illustrating an example of confidential notation added to printed matter by the post-processing apparatus illustrated in FIG. 1.
Figure 3B:
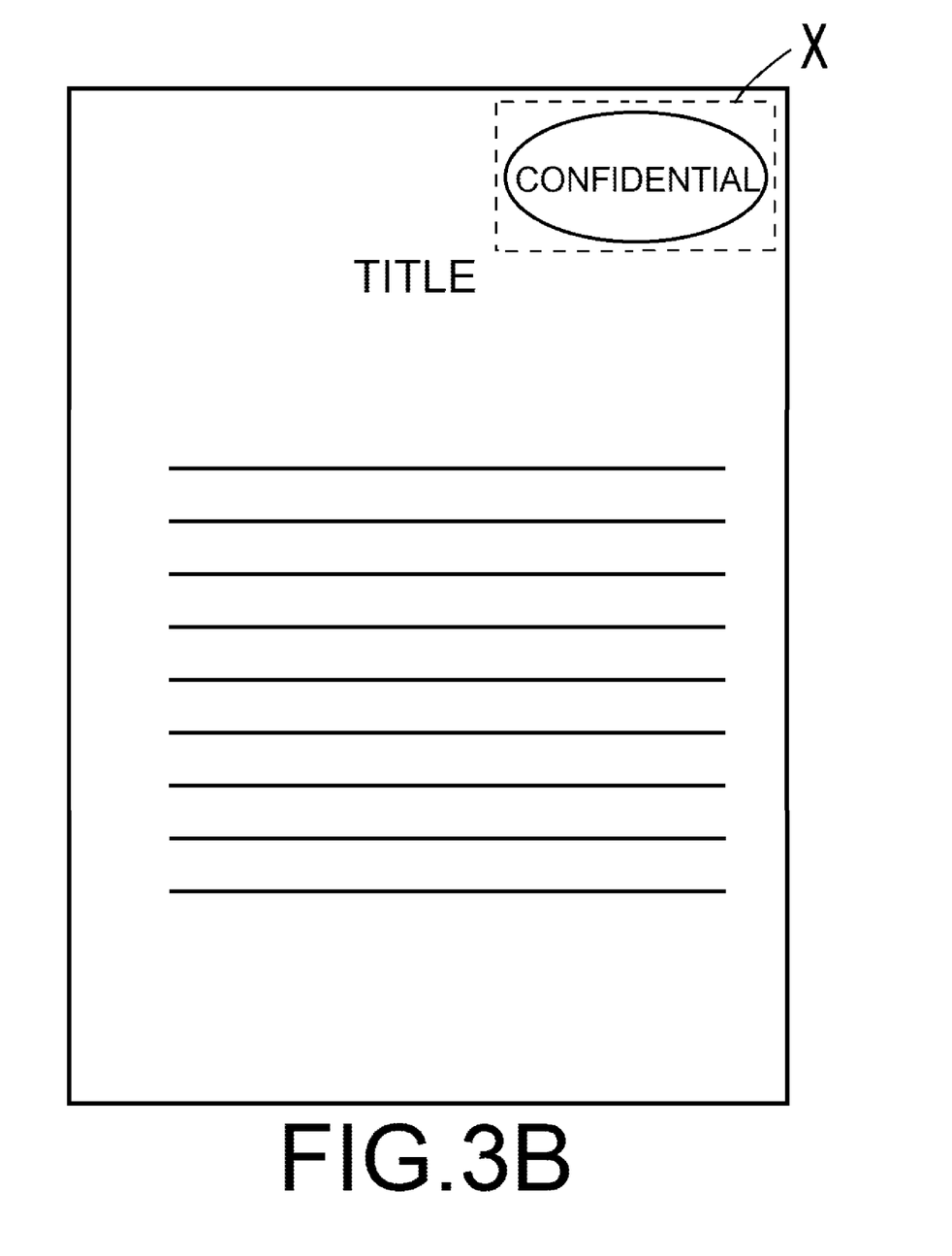
FIG. 3B is a diagram illustrating an example of confidential notation added to printed matter by the post-processing apparatus illustrated in FIG. 1.
Figure 3C:
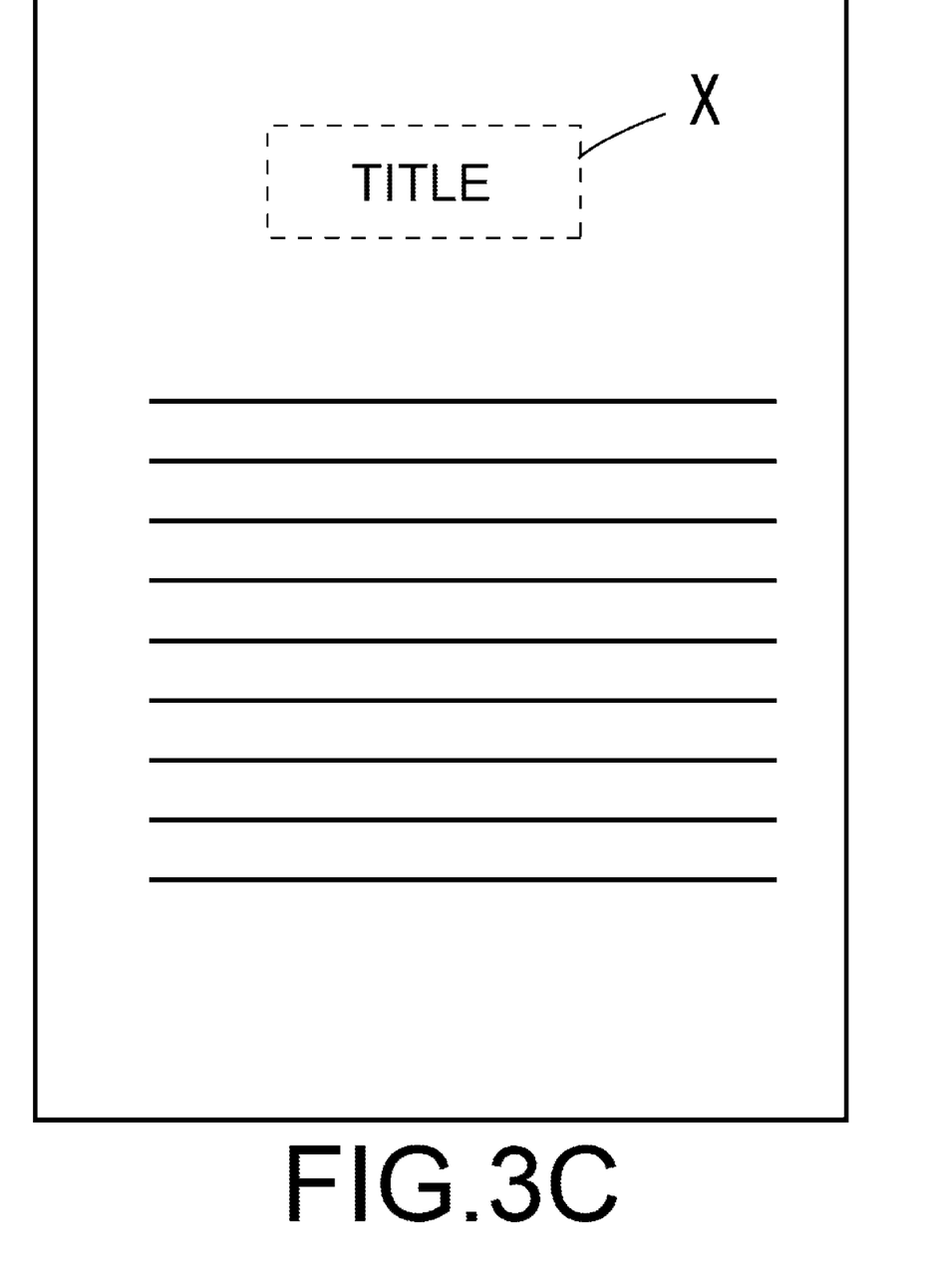
FIG. 3C is a diagram illustrating an example of confidential notation added to printed matter by the post-processing apparatus illustrated in FIG. 1.

Then, as illustrated in FIGS. 3A to 3C, the confidential notation addition control unit 22 adds the confidential notation X to the printing data for printing. The confidential notation X illustrated in FIG. 3A is a two-dimensional barcode obtained by encoding user information. Incidentally, the confidential notation X may be a normal bar code or a unique code set with the post-processing apparatus 30. Moreover, the confidential notation X illustrated in FIG. 3B is a mark indicating that the document is a confidential document. In this way, user information may be included in a mark added to the printing data. In addition, the confidential notation X illustrated in FIG. 3C is a character string of printing data. In this way, user information may be included in the printing data.

Note that in a case where the printing job has a plurality of pages, the confidential notation X may be printed on all the pages, or the confidential notation X that includes the number of pages may be printed only on the first page.

In addition, an image forming unit for confidential notation that prints the confidential notation X may be provided separately.

In addition, in a case where an image forming unit for confidential notation or a double-sided printing mechanism is provided, the confidential notation X may be printed on the back.

Referring to FIG. 1, the post-processing apparatus 30 has a confidential notation reading unit 31, an open tray 32, a user storage tray 33, an administrator storage tray 34, a tray raising/lowering mechanism 35, conveyance roller 36, and an operation unit 37.

The confidential notation reading unit 31 is a scanner that includes an exposure lamp and a CCD (Charge Coupled Device) sensor or the like that acquires image data by reading an area to which the confidential notation X is added in the printed matter outputted from the image forming apparatus 10. The confidential notation reading unit 31 may read the entire surface of the printed matter, or may read only a partial area to which the confidential notation X is added.

The open tray 32 is a tray from which anyone may remove outputted printed matter.

The user storage tray 33 and the administrator storage tray 34 include an opening/closing door 38 and a locking mechanism 39 for the opening/closing door 38, and are trays that are constructed so that outputted printed matter may not be removed unless the opening closing door 38 is opened.

The locking mechanism 39 is a mechanism that locks the opening/closing door 38 in a closed state, and has an auto lock function that automatically locks the opening/closing door 38 when closed. Incidentally, in the present embodiment, four stages of user storage trays 33 and one stage of an administrator storage tray 34 are provided, however the number of stages of user storage trays 33 is arbitrary.

The tray raising/lowering mechanism 35 is a mechanism for raising or lowering the open tray 32, the user storage tray 33, and the administrator storage tray 34 up and down. In addition, the conveyance roller 36 is a mechanism for conveying printed matter that is outputted from the image forming apparatus 10. The tray raising/lowering mechanism 35 and the conveyance roller 36 function as a sorting mechanism that sorts printed matter that is outputted from the image forming apparatus 10 and outputs the printed matter to any one of the open tray 32, the user storage trays 33 and the administrator storage tray 34.

The operation unit 37 includes a touch panel, operation buttons, a liquid crystal display and the like, and has a function as an input unit for receiving input of various information, and a function as a display unit for displaying various information.

Figure 4:
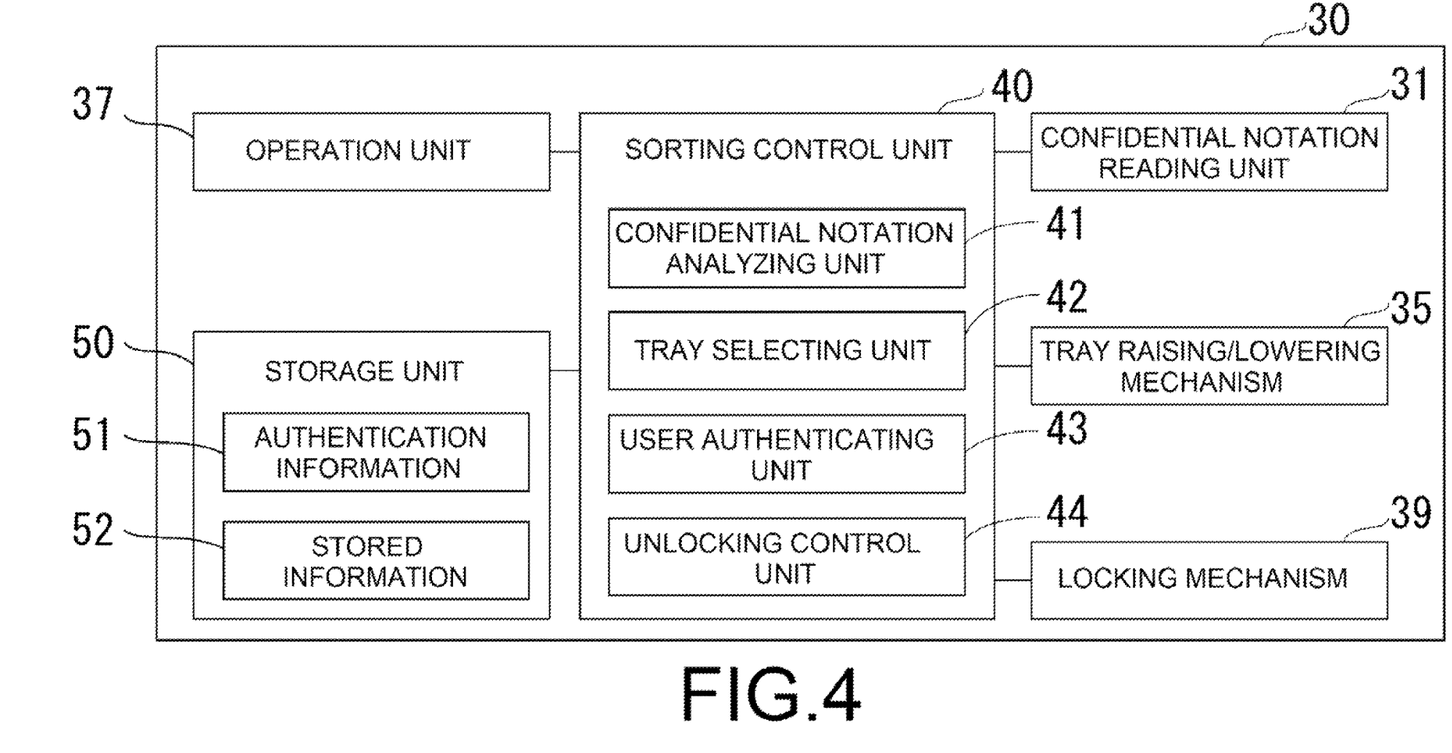
FIG. 4 is a block diagram illustrating a schematic configuration of the post-processing apparatus illustrated in FIG. 1.

FIG. 4 illustrates a block diagram of a schematic configuration of the post-processing apparatus 30. The confidential notation reading unit 31, tray raising/lowering mechanism 35, conveyance roller 36, and operation unit 37 described above are connected to a sorting control unit 40, and the operation is controlled by the sorting control unit 40. In addition, a storage unit 50 is connected to the sorting control unit 40.

The storage unit 50 is a storage unit such as a semiconductor memory, a hard disk drive (HDD) or the like, and stores authentication information 51 and storage information 52.

In the authentication information 51, together with the user ID and the password being registered in association with each other, the administrator ID and the password are registered in association with each other.

Figure 5:
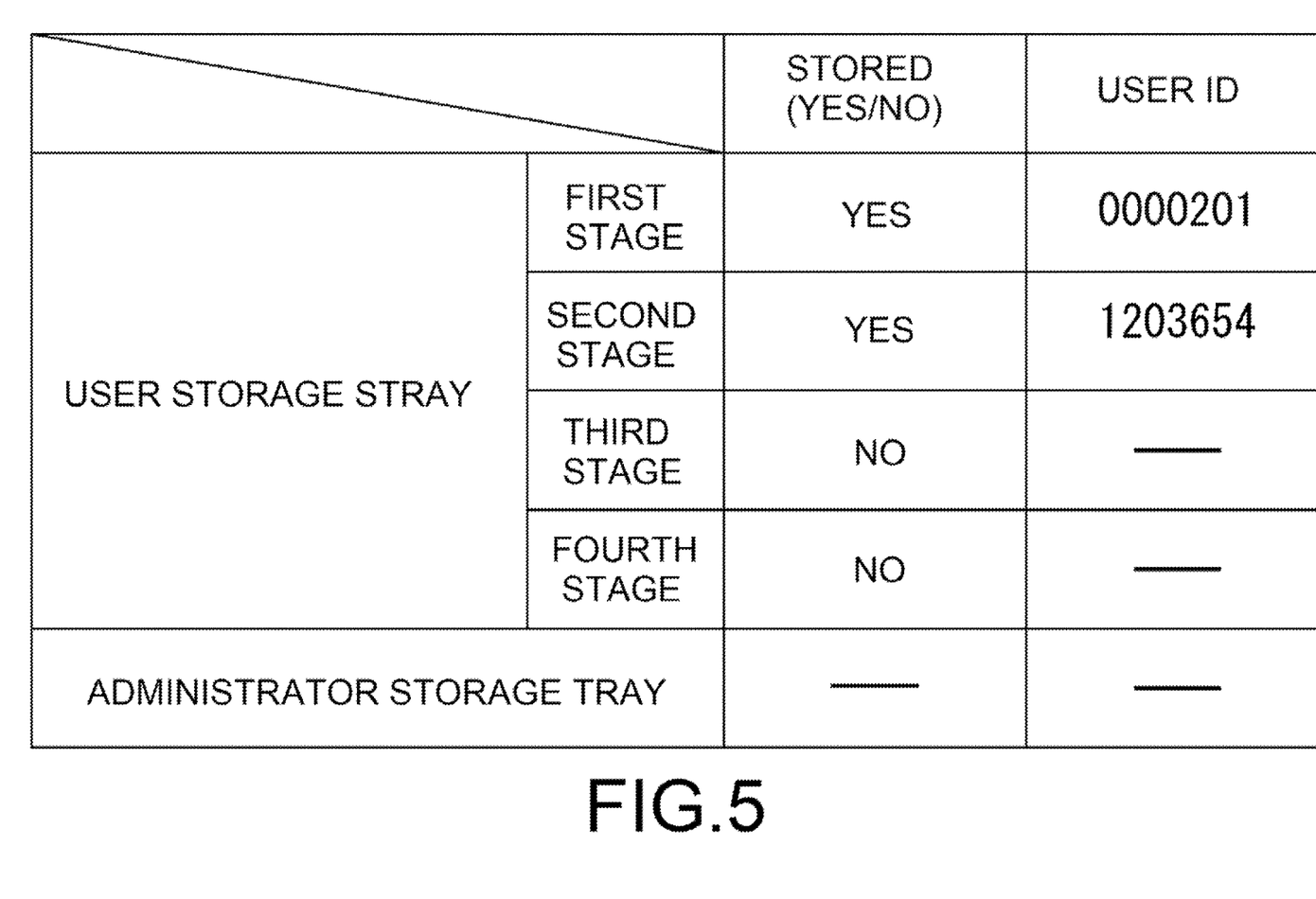
FIG. 5 is a diagram illustrating an example of storage information illustrated in FIG. 4

The storage information 52 is information indicating the storage status of the printed matter in the user storage trays 33 and the administrator storage tray 34, and as illustrated in FIG. 5, whether or not there is stored printed matter, and when there is printed matter stored, the user information of the stored printed matter is registered.

The sorting control unit 40 is an arithmetic processing circuit such as a microcomputer or the like that includes a central processing unit (CPU), a read only memory (ROM), a random access memory (RAM), and the like. A control program for performing operation control of the post-processing apparatus 30 is stored in the ROM. The sorting control unit 40 reads the control program stored in the ROM and develops the control program in the RAM, thereby performing overall control of the apparatus according to various instruction information that is inputted from the operation unit 37. In addition, the sorting control unit 40 functions as a confidential notation analyzing unit 41, a tray selecting unit 42, a user authenticating unit 43, and an unlocking control unit 44.

The confidential notation analyzing unit 41 analyzes the image data read by the confidential notation reading unit 31 and determines whether or not the confidential notation X is printed, and in a case where the confidential notation X is printed, extracts user information that is included in the confidential notation X.

The tray selecting unit 42 selects a tray to be stored from among the open tray 32, the user storage trays 33, and the administrator storage tray 34, and controls the tray raising/lowering mechanism 35 and the conveyance roller 36 to output printed matter to the selected tray.

The user authenticating unit 43 executes a user authentication operation that determines success or failure of authentication based on whether or not the combination of the specified user ID and the password for which the input is received is registered in the authentication information 51. Incidentally, biometric information may be registered in the authentication information 51, and user authentication may be performed based on the biometric information.

When authentication by the user authenticating unit 43 is successful, the unlocking control unit 44, based on the storage information 52, identifies the tray for which the successfully authenticated user ID is registered, and controls the locking mechanism 39 of the identified tray to open the opening/closing door 38.

Figure 6:
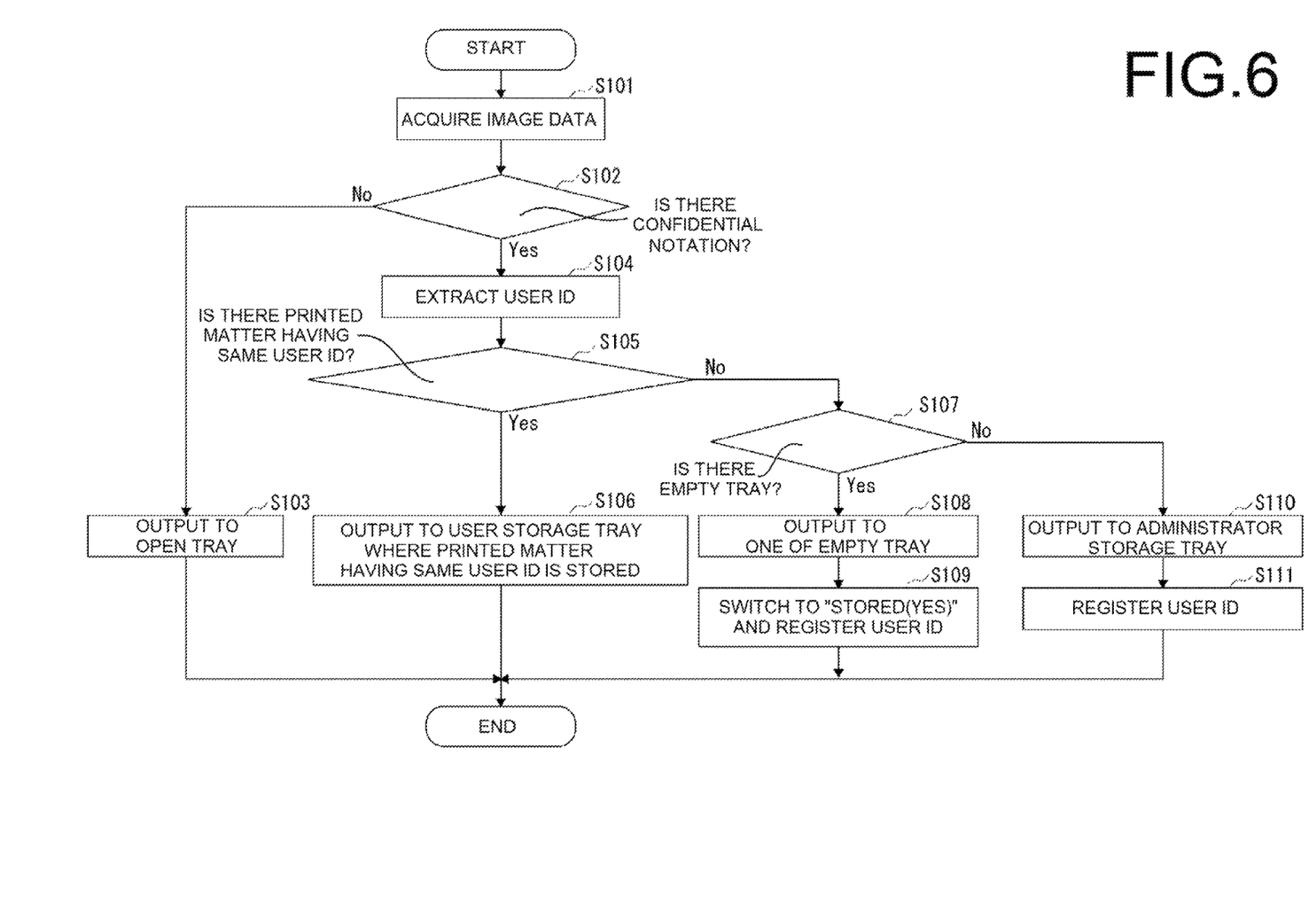
FIG. 6 is a flowchart for describing a sorting operation of sorting printed matter by the post-processing apparatus illustrated in FIG. 4.

Next, the sorting operation of the printed matter by the post-processing apparatus 30 will be described in detail with reference to FIG. 6.

When printed matter is outputted from the image forming apparatus 10, the confidential notation reading unit 31 of the post-processing apparatus 30 reads the area to which the confidential notation X is added in the printed matter outputted from the image forming apparatus 10, and acquires image data (step S101).

The confidential notation analyzing unit 41 analyzes the image data read by the confidential notation reading unit 31 and determines whether or not a confidential notation X is printed (step S102).

In step S102, in a case where a confidential notation X is not printed, the tray selecting unit 42 selects the open tray 32, controls the tray raising/lowering mechanism 35 and the conveyance roller 36, and outputs the printed matter to the open tray 32 (step S103). then ends the operation.

In step S102, in a case where a confidential notation X is printed, the confidential notation analyzing unit 41 extracts the user ID included in the confidential notation X (step S104).

Next, the tray selecting unit 42 refers to the storage information 52 and determines whether or not there is a user storage tray 33 in which printed matter having the same user ID is stored (step S105).

In step S105, in a case where there is a user storage tray 33 in which printed matter having the same user ID is stored, the tray selecting unit 42 selects the user storage tray 33 in which printed matter having the same user ID is stored. Then, the printed matter is outputted to the selected user storage tray 33 by controlling the tray raising/lowering mechanism 35 and the conveyance roller 36 (step S106), and the operation ends.

In step S105, in a case where there is no user storage tray 33 in which printed matter having the same user ID is stored, the tray selecting unit 42 refers to the storage information 52 and determines whether or not there is an empty tray in which printed matter is not stored in the user storage trays 33 (step S107).

In a case where there is an empty tray in step S107, the tray selecting unit 42 selects one of the empty trays, and by controlling the tray raising/lowering mechanism 35 and the conveyance roller 36, outputs the printed matter to the selected empty tray (user storage tray 33) (step S108). Then, the tray selecting unit 42, together with switching the selected user storage tray 33 to "stored" in the storage information 52, registers the user ID (step S109), and ends the operation.

In step S107, in a case where there is no user storage tray 33 in which no printed matter is stored, the tray selecting unit 42 selects the administrator storage tray 34, by controlling the tray raising/lowering mechanism 35 and the conveyance roller 36, outputs the printed matter to the selected administrator storage tray 34 (step S110). Then, the tray selecting unit 42 registers the user ID for the administrator storage tray 34 in the storage information 52 (step S111), and ends the operation. Incidentally, the administrator storage tray 34 is a re-routing tray for storing printed matter when a user storage tray 33 is not empty. Therefore, printed matter of different users may be stored in the administrator storage tray 34.

Figure 7:
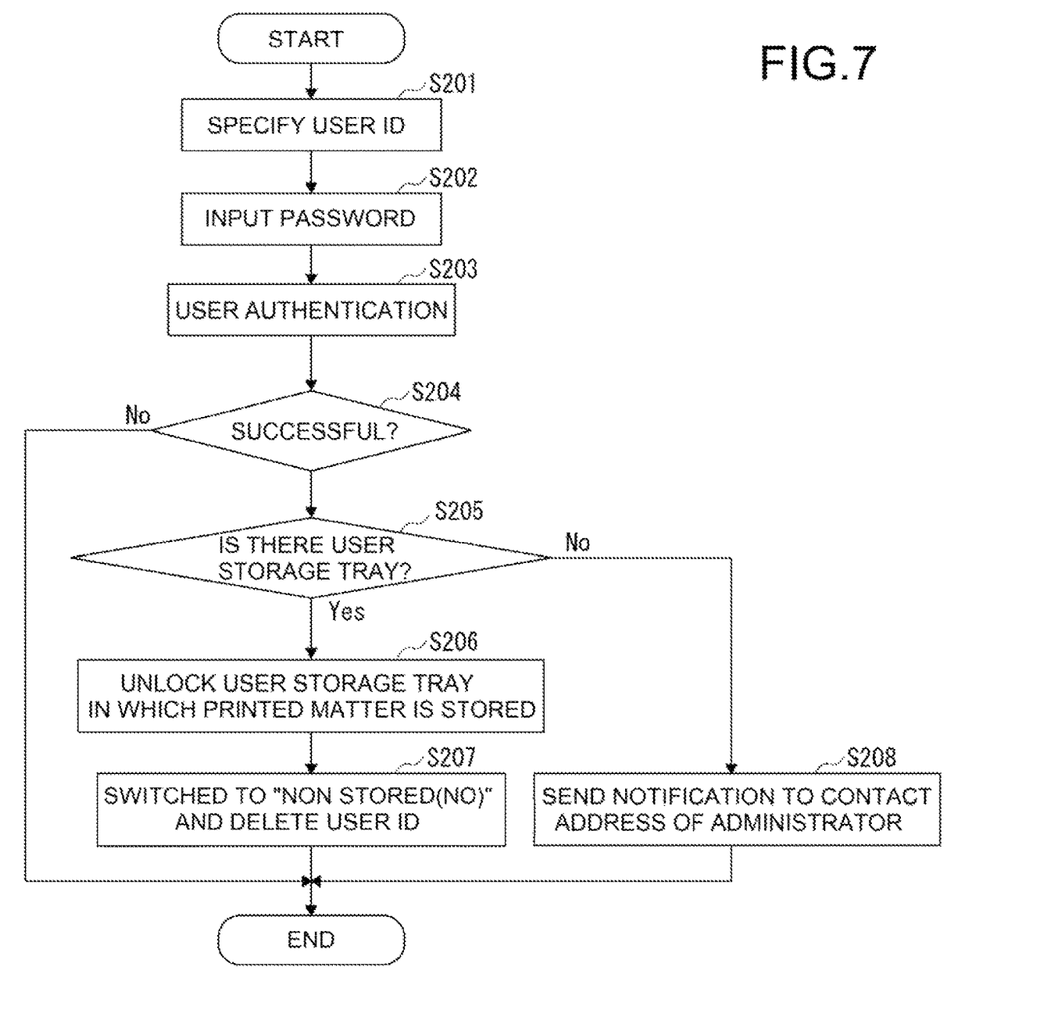
FIG. 7 is a flowchart for describing a removal control operation of removing the printed matter in the post-processing apparatus illustrated in FIG. 4.

Next, in the post-processing apparatus 30, a removal control operation for removing the printed matter stored in a user storage tray 33 and the administrator storage tray 34 will be described in detail with reference to FIG. 7.

The user authenticating unit 43 displays a list of user IDs registered in the storage information 52 on the operation unit 37, and receives a user ID specified by the user (step S201).

Next, the user authenticating unit 43 receives input of a password by the operation unit 37 (step S202).

Next, the user authenticating unit 43 executes user authentication for determining whether or not the combination of the specified user ID and the password for which input has been received is registered in the authentication information 51 (step S203), and determines whether or not authentication succeeded or failed (step S204).

In a case where authentication fails in step S204, the user authenticating unit 43 ends the removal control operation.

In step S204, in a case where authentication is successful, the unlocking control unit 44 refers to the storage information 52 and determines whether or not the tray for which the user ID is registered is a user storage tray 33 (step S205).

In step S205, in a case where the tray is a user storage tray 33, the unlocking control unit 44 unlocks the opening/closing door 38 by controlling the locking mechanism 39 of the user storage tray 33 for which the user ID is registered in the storage information 52 (Step S206). When doing this, the opening/closing door 38 may be configured to automatically open by unlocking, or the unlocked user storage tray 33 may be displayed on the operation unit 37 to notify the user.

Next, the unlocking control unit 44, together with switching the unlocked user storage tray 33 to non-stored in the storage information 52, deletes the user ID (step S207), and ends the operation.

In step S205, in a case where the tray is not a user storage tray 33 but is the administrator storage tray 34, the unlocking control unit 44 displays the contact information of the administrator that is stored in advance on the operation unit 37 to notify the user (step S208), and ends the operation.

Note that the unlocking control unit 44 controls the locking mechanism 39 of the administrator storage tray 34 to unlock the opening/closing door 38 when authenticated as an administrator by the administrator ID and password. As a result, removal of the printed matter stored in the administrator storage tray 34 is limited to the administrator, and security can be ensured even when there is no empty user storage tray 33.

As described above, the present embodiment is an image forming system that includes: an image forming apparatus 10 that outputs printed matter; and a post-processing apparatus 30 that sorts printed matter that is outputted from the image forming apparatus 10; wherein the image forming apparatus 10 includes: a confidential notation generating unit 21 for generating confidential notation X that includes user information for identifying a user; and a confidential notation addition control unit 22 for adding a confidential notation X to printed matter; and the post-processing apparatus 30 includes: a confidential notation reading unit 31 for reading the confidential notation X added to the printed matter; an open tray 32 from which anyone may remove printed matter that has been outputted; a user storage tray 33 having a structure from which outputted printed matter cannot be removed unless an opening/closing door 38 is opened; a locking mechanism 39 for locking the opening/closing door 38; a sorting mechanism (tray raising/lowering mechanism 35, conveyance roller 36) that sorts the printed matter outputted from the image forming apparatus 10 and outputs the printed matter to either the open tray 32 or the user storage tray 33; and a sorting control unit 40 controls the sorting mechanism to output printed matter to which a confidential notation X is not added to the open tray 32, and output printed matter to which a confidential notation X is added to the user storage tray 33.

With this configuration, printed matter addressed to a specific user is outputted to the lockable user storage tray 33, so even when printing is executed in advance, it is possible to reliably prevent the printed matter from being removed and taken by others.

Furthermore, in this embodiment, the post-processing apparatus 30 includes: an operation unit 37 that is an input unit for receiving input of authentication information (user ID, password); a user authenticating unit 43 that executes user authentication according to authentication information inputted from the operation unit 37; and an unlocking control unit 44 that controls the locking mechanism 39 to unlock the opening/closing door 38 of the user storage tray 33 in a case where the user authenticating unit 43 is successful in authenticating a user identified by the user information.

With this kind of configuration, printed matter can be removed immediately after authentication, so work efficiency can be improved.

Moreover, in this embodiment, an administrator storage tray 34 is provided that has a structure in which outputted printed matter cannot be removed unless the opening/closing door 38 is opened; and the sorting mechanism sorts printed matter outputted from the image forming apparatus 10 and outputs the printed matter to any one of the open tray 32, a user storage tray 33, and the administrator storage tray 34; the sorting control unit 40, in a case where a confidential notation X is added to the printed matter and there is no empty user storage tray 33, controls the sorting mechanism to output the printed matter to the administrator storage tray 34; and the unlocking control unit 44, in a case where the user authenticating unit 43 is successful in authenticating the administrator, controls the locking mechanism 39 to unlock the opening/closing door 38 of the administrator storage tray 34.

With this configuration, even in a case where there is no empty user storage tray 33, printed matter that is addressed to a specific user is outputted to a lockable administrator storage tray 34, so even when printing is executed beforehand, it is possible to reliably prevent others from removing and taking the printed matter.

In the above-described typical technique, in order to prevent others from removing and taking printed matter, the user has to wait in front of the apparatus from the start to the end of printing, so there is a problem that work efficiency is poor.

In consideration of the problems described above, an object of the present disclosure is to provide an image forming system capable of reliably preventing others from removing and taking an outputted recording media even when output of a recording media on which an image is formed is executed beforehand.

With the technique according to the present disclosure, an effect is obtained in which a recording media that is outputted to a specific user is outputted to a lockable user storage tray, so it is possible to reliably prevent others from removing and taking an outputted recording media even when output of a recording media on which an image is formed is executed beforehand.

Incidentally, It is obvious that the present disclosure is not limited to the above-described embodiments, and each embodiment can be appropriately changed within the scope of the technical idea of the present disclosure. Moreover, the number, position, shape, and the like of the constituent members described above are not limited to those of the above-described embodiments, and can be set to a suitable number, position, shape, and the like for carrying out the present disclosure. Note that in each figure, the same reference numbers are given to the same constituent elements.

What is claimed is:

1. An image forming system comprising: an image forming apparatus that outputs a recording media on which an image is formed; and a post-processing apparatus that sorts the recording media that is outputted from the image forming apparatus; wherein
    the image forming apparatus comprises:
    a confidential notation generating unit for generating a confidential notation that includes user information for identifying a user; and
    a confidential notation addition control unit for adding the confidential notation to the recording media;
    the post-processing apparatus comprises:
    a confidential notation reading unit for reading the confidential notation added to the recording media;
    an open tray from which anyone may remove recording media that has been outputted;
    a user storage tray having a structure from which the outputted recording media cannot be removed unless an opening/closing door is opened;
    a locking mechanism for locking the opening/closing door;
    a sorting mechanism that sorts the recording media outputted from the image forming apparatus and outputs the recording media to either the open tray or the user storage tray;
    a sorting control unit that controls the sorting mechanism to output the recording media to which the confidential notation is not added to the open tray, and output the recording media to which the confidential notation is added to the user storage tray, respectively;
    an input unit for receiving input of authentication information;
    a user authenticating unit that executes user authentication according to the authentication information inputted from the input unit; and
    an unlocking control unit that controls the locking mechanism to unlock the opening/closing door of the user storage tray in a case where the user authenticating unit is successful in authenticating a user identified by the user information; and
    the image forming system further comprises:
    an administrator storage tray having a structure in which the outputted recording media cannot be removed unless the opening/closing door is opened;
    wherein
    the sorting mechanism sorts the recording media outputted from the image forming apparatus and outputs the recording media to any one of the open tray, the user storage tray, and the administrator storage tray;
    the sorting control unit, in a case where the confidential notation is added to the recording media and there is no empty user storage tray, controls the sorting mechanism to output the recording media to the administrator storage tray; and
    the unlocking control unit, in a case where the user authenticating unit is successful in authenticating an administrator, controls the locking mechanism to unlock the opening/closing door of the administrator storage tray.

2. A post-processing apparatus for sorting recording media outputted from an image forming apparatus, comprising:
    a confidential notation reading unit for reading a confidential notation added to the recording media;
    an open tray from which anyone may remove the recording media that has been outputted;
    a user storage tray having a structure from which the outputted recording media cannot be removed unless an opening/closing door is opened;
    a locking mechanism for locking the opening/closing door;
    a sorting mechanism that sorts the recording media outputted from the image forming apparatus and outputs the recording media to either the open tray or the user storage tray;
    a sorting control unit that controls the sorting mechanism to output the recording media to which the confidential notation is not added to the open tray, and output the recording media to which the confidential notation is added to the user storage tray, respectively;
    an input unit for receiving input of authentication information;
    a user authenticating unit that executes user authentication according to the authentication information inputted from the input unit;
    an unlocking control unit that controls the locking mechanism to unlock the opening/closing door of the user storage tray in a case where the user authenticating unit is successful in authenticating a user identified by user information; and
    an administrator storage tray having a structure in which the outputted recording media cannot be removed unless the opening/closing door is opened;
    wherein
    the sorting mechanism sorts the recording media outputted from the image forming apparatus and outputs the recording media to any one of the open tray, the user storage tray, and the administrator storage tray;
    the sorting control unit, in a case where the confidential notation is added to the recording media and there is no empty user storage tray, controls the sorting mechanism to output the recording media to the administrator storage tray; and
    the unlocking control unit, in a case where the user authenticating unit is successful in authenticating an administrator, controls the locking mechanism to unlock the opening/closing door of the administrator storage tray.

* * * * *